United States Patent
Winston

(10) Patent No.: US 10,177,992 B2
(45) Date of Patent: Jan. 8, 2019

(54) APPLICATION STORE INTERFACE FOR REMOTE MANAGEMENT OF CLIENT DEVICES

(75) Inventor: Bradley Scott Winston, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1154 days.

(21) Appl. No.: 14/350,258

(22) PCT Filed: Oct. 27, 2011

(86) PCT No.: PCT/US2011/057981
§ 371 (c)(1),
(2), (4) Date: Apr. 7, 2014

(87) PCT Pub. No.: WO2013/062546
PCT Pub. Date: May 2, 2013

(65) Prior Publication Data
US 2014/0316990 A1 Oct. 23, 2014

(51) Int. Cl.
*G06F 9/445* (2018.01)
*H04L 12/24* (2006.01)
(Continued)

(52) U.S. Cl.
CPC ............ *H04L 41/50* (2013.01); *G06F 9/4411* (2013.01); *G06Q 20/40* (2013.01)

(58) Field of Classification Search
CPC ........ H04L 41/22; G06Q 10/00; G06Q 20/40; G06Q 30/06; G06F 8/60; G06F 8/61; G06F 21/10; G06F 21/31; G06F 8/65
See application file for complete search history.

(56) References Cited

U.S. PATENT DOCUMENTS 6,493,871 B1  12/2002  McGuire et al.
7,028,296 B2   4/2006  Irfan et al.
(Continued)

FOREIGN PATENT DOCUMENTS

CN  1471008       1/2004
CN  101872309 A  10/2010
(Continued)

OTHER PUBLICATIONS

Eugene Hung and Joseph Pasquale, Web Customization Using Behavior-Based Remote Executing Agents, ACM, 2004, retrieved online on Aug. 30, 2018, pp. 694-730. Retrieved from the Internet: <URL: http://delivery.acm.org/10.1145/990000/988767/p694-hung.pdf?>. (Year: 2004).*

(Continued)

*Primary Examiner* — Hanh Thi-Minh Bui
(74) *Attorney, Agent, or Firm* — HP Inc. Patent Department

(57) ABSTRACT

Example embodiments relate to an application store interface provided to enable remote management of client devices. In example embodiments, a server transmits an application store interface identifying applications available for installation by an administrative user associated with a number of client devices. The application store interface may then receive a selection of an application to be installed from the administrative user. In response, the application store interface may trigger installation of the selected application on each of the client devices by an agent executing on each device.

19 Claims, 4 Drawing Sheets

(51) Int. Cl.
*G06F 9/4401* (2018.01)
*G06Q 20/40* (2012.01)

(56) References Cited

U.S. PATENT DOCUMENTS

| | | | |
|---|---|---|---|
| 7,246,351 | B2 | 7/2007 | Bloch et al. |
| 7,685,595 | B1 | 3/2010 | Manahan et al. |
| 7,899,959 | B2 | 3/2011 | Anwer |
| 8,924,957 | B1* | 12/2014 | Newstadt ................. G06F 8/61 |
| | | | 717/173 |
| 9,747,097 | B2* | 8/2017 | Peluso ...................... G06F 8/65 |
| 2003/0046675 | A1 | 3/2003 | Cheng et al. |
| 2004/0010786 | A1 | 1/2004 | Cool et al. |
| 2006/0073785 | A1 | 4/2006 | Klassen et al. |
| 2009/0157794 | A1* | 6/2009 | Sheshadri .......... G06Q 30/0603 |
| | | | 709/202 |
| 2010/0325239 | A1 | 12/2010 | Khedouri et al. |
| 2010/0332996 | A1* | 12/2010 | Sarkaria ................... G06F 8/60 |
| | | | 715/748 |
| 2011/0010704 | A1 | 1/2011 | Jeon et al. |
| 2011/0137979 | A1* | 6/2011 | Seo ....................... G06F 9/4411 |
| | | | 709/203 |
| 2014/0366014 | A1* | 12/2014 | Mair ....................... G06F 21/10 |
| | | | 717/177 |

FOREIGN PATENT DOCUMENTS

| | | |
|---|---|---|
| KR | 10-2011-0004650 A | 1/2011 |
| TW | 201118732 A | 6/2011 |
| WO | WO-2010/034329 A1 | 4/2010 |
| WO | WO-2010/119428 A1 | 10/2010 |

OTHER PUBLICATIONS

International Search Report and Written Opinion, International Application No. PCT/US2011/057981, dated Jul. 19, 2012, pp. 1-9.
European Patent Office, Extended European Search Report for EP Appl. No. 11874650.2 dated Jun. 5, 2015 (6 pages).

* cited by examiner

APPLICATION STORE INTERFACE FOR REMOTE MANAGEMENT OF CLIENT DEVICES

CROSS-REFERENCE TO RELATED APPLICATION

This application is a national stage application under 35 U.S.C. § 371 of PCT/US2011/057981, filed Oct. 27, 2011.

BACKGROUND

Information technology (IT) systems administration is a field that focuses on the management of servers, personal computers, mobile devices, and other technology assets of a corporation, government entity, or other organization. System administrators are typically responsible for software and hardware installation, network security, troubleshooting, and a number of other tasks necessary to maintain a computing system in working order. These positions are generally technically demanding and require specialized training for effective management of the IT assets.

BRIEF DESCRIPTION OF THE DRAWINGS

The following detailed description references the drawings, wherein.

DETAILED DESCRIPTION

As detailed above, systems administration is a complex endeavor that generally requires specialized knowledge related to various tasks. For example, a system administrator is typically responsible for installing and updating software on the client devices within an enterprise network. This is a task that often requires significant manual effort for each device. For example, in some small enterprises, the system administrator may move from machine-to-machine to manually install the software on each client using a CD-ROM, flash memory drive, or other copy of the software. In larger enterprises, the system administrator may have remote access to each device, but often needs to manually trigger the installation on each device. In the largest of enterprises, the process may be partially automated, but the management software is often complex and requires interaction with arcane, confusing user interfaces.

Example embodiments disclosed herein address these issues by allowing an administrative user to remotely manage client devices by selecting applications to be installed on multiple clients from an application store interface. For example, in some embodiments, a server transmits an application store interface identifying applications available for installation on client devices managed by the administrative user. The application store interface may then receive a selection of an application to be installed from the administrative user. In response, the application store interface may trigger installation of the selected application on multiple client devices by an agent executing on each client device. In some implementations, the application store interface may notify a management console of the selection of the application and, in response, the management console may manage the process for installing the selected application by communicating with the agents on the client devices.

In this manner, example embodiments disclosed herein greatly simplify the remote administration of client devices. In particular, by allowing for installation of software on multiple devices from an easy-to-use enterprise application store interface, example embodiments allow a user with minimal technical knowledge to easily manage the software within a computing environment. Furthermore, some implementations leverage a manageability console to control the installation process, such that the application store interface may operate as a front-end without the need for separately implementing the complex functionality that installs the software on each client. Thus, various embodiments described herein reduce the cost of managing software in an enterprise network regardless of the size of the enterprise.

Figure 1:
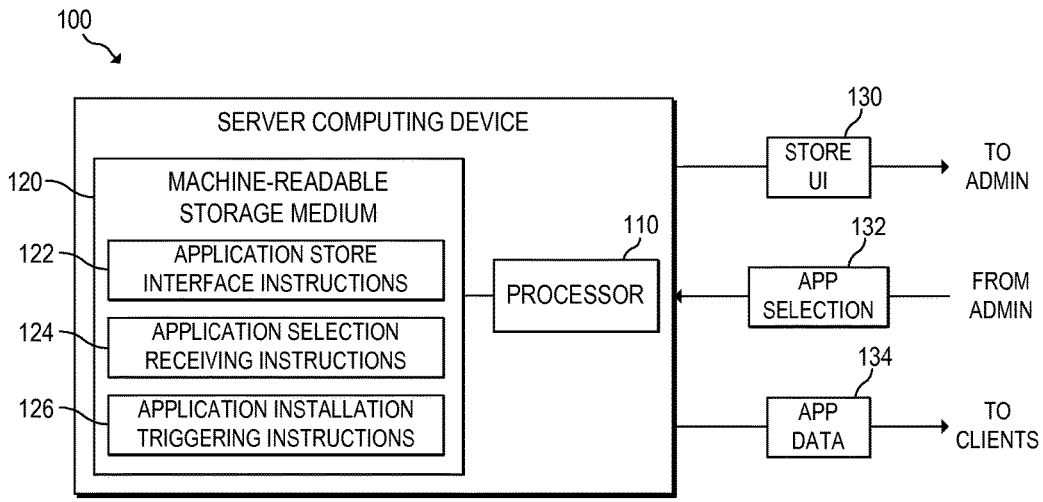
FIG. 1 is a block diagram of an example server computing device for providing an application store interface to enable remote management of client devices.

Referring now to the drawings, FIG. 1 is a block diagram of an example server computing device 100 for providing an application store interface to enable remote management of client devices. Server computing device 100 may be, for example, a Local Area Network (LAN) server, a cloud-based server, or any other computing device suitable for providing an application store interface to remote devices. In the embodiment of FIG. 1, server computing device 100 includes a processor 110 and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126 to install applications based on user interaction with an application store interface, as described below. As an alternative or in addition to retrieving and executing instructions, processor 110 may include one or more electronic circuits comprising a number of electronic components for performing the functionality of one or more of instructions 122, 124, 126.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for transmitting an application store interface that enables installation of applications on multiple client devices.

Application store interface instructions 122 may transmit an application store interface 130 that identifies a plurality of applications available for installation by an administrative user. For example, in response to a request from a device of the administrative user (e.g., device 200 of FIG. 2), server computing device may transmit an application store user interface (UI) 130. Each application included in the interface 130 may be any software suitable for installation on client devices, including, for example, a program dedicated to a particular task (e.g., a word processor, photo editor, etc.), an operating system, a device driver or firmware, a script, or any other set of executable instructions. The format of the application store UI 130 may vary by implementation. As one example, the application store user interface 130 may be a set of Hypertext Markup Language (HTML) documents or other files readable by a web browser or dedicated application store software on the user's device.

Regardless of the format, the UI 130 may include a listing of applications available for installation on the client devices managed by the administrative user. The administrative user may be any person with authority to install applications on the client devices (e.g., an IT employee, an executive, etc.). The UI 130 may include an indication of a purchase amount for each application, which may be "free" for some or all of the applications. The UI 130 may further include an "install" button or other user interface element(s) that allow the administrative user to pay for an application (if the application is not free) and subsequently trigger installation of the application on multiple client devices. For example, the UI 130 may include a single install button for each application or a shopping cart interface that enables a user to select multiple applications to be installed simultaneously.

Subsequent to transmission of the store UI 130, application selection receiving instructions 124 may receive a selection of an application 132 to be installed on a plurality of client computing devices associated with the administrative user. For example, in response to receipt of the application store UI 130, the administrative user may browse the interface and select an application to be installed on the clients within the administrative user's computing environment. Receiving instructions 124 may receive the application selection 132 from the administrative user's device, parse the selection 132, and notify triggering instructions 126 of the selected application.

Finally, in response to the selection 132 of an application to be installed, application installation triggering instructions 126 may cause installation of the application on each client in the administrative user's computing environment. The computing environment may include any devices identified as targets for installation of applications. For example, in some implementations, the administrative user may manually identify each client device within his or her environment by providing identifying information for each device (e.g, an Internet Protocol address, Media Access Control (MAC) address, etc.). As another example, an agent executing on each client may automatically establish communication with server 100 and identify itself as included within the computing environment.

Regardless of the mechanism for identifying the clients in the environment, the application store interface may trigger installation of the particular application by an agent executing on each of the plurality of client devices. Each agent may be an application that communicates with server 100 to perform tasks on the client on which the agent is installed. Thus, in some implementations, application installation triggering instructions 126 may directly establish communication with the agent executing on each client in the computing environment. Triggering instructions 126 may then retrieve application data 134 from storage accessible to server 100 and begin transmission of the data 134 to each client for installation of the application by the agent.

In other implementations, a management console located on server computing device 100 or another server may manage the application installation process. The management console may be a server-based application that collects information regarding clients within a given computing environment and executes tasks with respect to those clients. In these implementations, the application store interface may trigger installation by providing an instruction to the management console via a portal. Upon receipt of the install instruction from the application store interface, the management console may identify a management policy corresponding to the selected application. After identifying the management policy, the management console may then communicate with the agent executing on each client in the computing environment to manage the process for installing the selected application on each client. More specifically, the management console may manage the transmission of application data 134 to each client's agent. In such implementations, the application store interface serves as a front-end to the management console, thereby significantly simplifying use of the management console.

Figure 2:
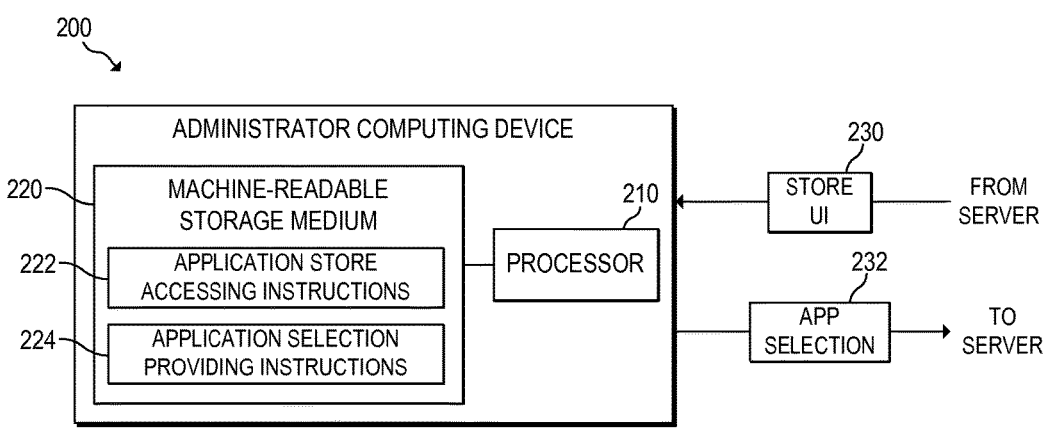
FIG. 2 is a block diagram of an example administrator computing device for accessing an application store interface from a server to remotely manage client devices.

FIG. 2 is a block diagram of an example administrator computing device 200 for accessing an application store interface from a server to remotely manage client devices. Administrator computing device 200 may be, for example, a notebook computer, a desktop computer, an all-in-one system, a thin client, a workstation, a tablet computing device, a mobile phone, or any other computing device suitable for execution of the functionality described below. In the embodiment of FIG. 2, administrator computing device 200 includes processor 210 and machine-readable storage medium 220.

As with processor 110 of FIG. 1, processor 210 may be one or more CPUs, microprocessors, and/or other hardware devices suitable for retrieval and execution of instructions. Processor 210 may fetch, decode, and execute instructions 222, 224 to implement the application selecting procedure described below. Processor 210 may also or instead include electronic circuitry for performing the functionality of one or more instructions 222, 224. As with storage medium 120 of FIG. 1, machine-readable storage medium 220 may be any physical storage device that contains or stores executable instructions.

Application store accessing instructions 222 may access the application store interface provided by a server computing device, such as server 100 of FIG. 1. In some instances, server 100 may be a cloud-based server that is accessible to administrator computing device 200 over the Internet. Regardless of the location of server 100, administrator computing device 200 may receive an application store UI 230 identifying applications available to be installed on client devices associated with the administrative user. For example, the client devices may be devices in a computing environment managed by the administrative user. Upon receipt of application store UI 230, accessing instructions 222 may output the UI on an available display of device 200 using a web browser or other application capable of displaying UI 230.

Application selection providing instructions 224 may enable the administrative user to select an application for installation on multiple client devices. For example, the administrative user may activate an install button displayed in application store UI 230 for a particular application available for installation. In response, providing instructions 224 may return the application selection 232 to server computing device 100. As detailed above in connection with FIG. 1, server computing device 100 may then trigger installation of the selected application on each of the plurality of client devices within the administrative user's computing environment.

In this manner, by simply interacting with the application store user interface 230, the user of administrator computing device 200 may trigger the installation of a particular application on each of the clients under his or her control. Furthermore, in implementations in which server 100 is cloud-based, a cloud service provider or other third party may manage the installation process, thereby minimizing the need for a dedicated management server within the administrative user's computing environment.

Figure 3:
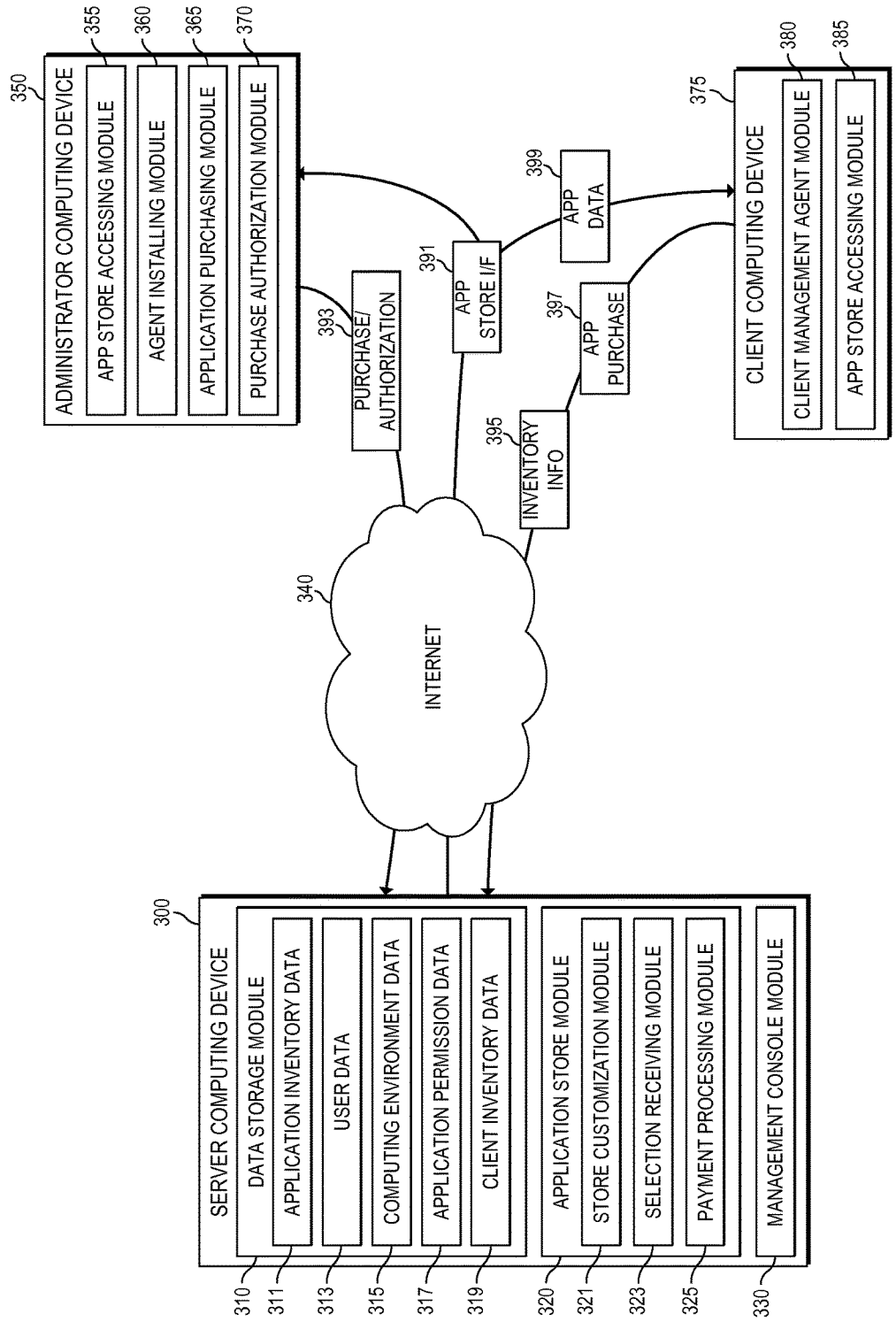
FIG. 3 is a block diagram of an example system for enabling remote management using a server computing device in communication with an administrator computing device and a client computing device.

FIG. 3 is a block diagram of an example system for enabling remote management using a server computing device 300 in communication with an administrator computing device 350 and a client computing device 375. As illustrated in FIG. 3 and described below, server computing device 300 may communicate with computing devices 350, 375 to provide an application store interface, to receive selections of application purchases from the application store, and to install the selected applications on client devices.

As illustrated, client computing device 300 may include a number of modules 310-330. Similarly, administrator computing device 350 may include a number of modules 355-370, while client computing device 375 may include a number of modules 380, 385. Each of the modules may include a series of instructions encoded on a machine-readable storage medium and executable by a processor of the respective device 300, 350, 375. In addition or as an alternative, each module may include one or more hardware devices including electronic circuitry for implementing the functionality described below.

In the implementation of FIG. 3, server computing device 300 may be a cloud-based server in communication with administrator computing device 350 and client computing device 375 over the Internet 340. Thus, server computing device 300 may, in some instances, be managed by a cloud service provider or other third party separate from the enterprise network to which administrator device 350 and client computing device 375 belong. Server computing device 300 may include a series of modules 310-330 for providing an application store interface and processing purchases of applications by users of computing devices 350, 375.

Data storage module 310 may comprise a number of physical media for storing data under the direction of a processor of server computing device 300. For example, data storage module 310 may include one or more hard disk drives, solid state drives, tape drives, and/or any other storage devices. The storage devices may be located in server computing device 300 and/or in another device in communication with server 300. As detailed below, data storage module 310 may store a plurality of sets of data 311-319 accessed by application store module 320 and management console module 330.

Application inventory data 311 may maintain data related to the applications available for installation by management console module 330. For example, application inventory data 311 may store a list of applications available for installation and, for each application, a description of the application, a purchase price (if applicable), license terms, and any other metadata relating to the application. Application inventory data 311 may also include data for installing each application, such as an installation package or executable used to install the application through communication between management console module 330 and a client management agent module 380 of each client.

User data 313 may store user account data that manages access of the application store interface by administrative users and other clients. For example, user data 313 may store a user identifier for each user, such as a user name or email address, and a corresponding password or other authorization data. Additionally, user data 313 may store a level of permissions for each user, such as an indication whether the user is an administrative user or a general client user. Application store module 320 may access user data 313 in conjunction with a login procedure to ensure that a user has authorization to access the application store interface and to install particular applications.

Computing environment data 315 may store data used to track the IT assets within a given enterprise network. For example, environment data 315 may store identifying information for each PC and mobile device within a computing environment, such as an IP address or MAC address. Management console module 330 may access computing environment data 315 to identify clients on which a particular application should be installed.

Application permission data 317 may store purchases or authorizations 393 received from a user of an administrator device 350. For example, when an administrative user purchases an application with an instruction to immediately install the application on client devices, permission data 317 may store an identification of the purchased application, details of the terms of the license, and data regarding the devices on which the application was installed. Similarly, when an administrative user provides permission to individual clients to purchase an application, permission data 317 may store information identifying the application and an indication that clients in the computing environment are authorized to purchase the application. Application store module 320 may access the application permission data 317 to customize the application store interface for clients based on the permissions provided by the administrative user.

Client inventory data 319 may store client inventory information 395 received from an agent 380 executing on each of the clients in a computing environment. For example, client inventory data 319 may store information regarding applications installed on a client, versions of the installed applications, and usage information regarding the installed applications (e.g., the amount of time spent using each application). In addition or as an alternative, client inventory data 319 may describe the drivers, operating system, or hardware of each client. As described in further detail below, application store module 320 may access client inventory data 319 to customize the application store to display applications that are likely to be of interest to the administrative user and/or clients.

Application store module 320 may include a series of modules 321, 323, 325 for providing an application store interface that enables administrative users and other clients to easily select and install applications. In particular, as described below with reference to each module 321, 323, 325, application store module 320 may generate a store interface, transmit the interface to administrator or client devices 350, 375, process application purchases, and trigger installation of the purchased applications via communication with management console module 330.

Store customization module 321 may generate a customized application store interface 391 depending on whether the request to access the store originated from an administrative user of computing device 350 or from a client user of computing device 375. When the requesting user is an administrative user, store customization module 321 may generate an interface 391, which, in some implementations, may include all applications available for installation on client devices. Store customization module 321 may also filter the applications available for installation or provide a list of suggestions to the administrative user based on client inventory data 319. For example, store customization module 321 may identify the client devices in the administrative user's computing environment and identify applications that are not currently installed on the client devices. As another example, store customization module 321 may identify applications for which new versions or other updates are available and notify the administrator of the availability of the updates. After generating the customized store interface for the administrative user, store customization module 321 may transmit the store interface 391 via Internet 340 to administrator computing device 350 for display.

Alternatively, when the user requesting access to the application store is a client user, store customization module 321 may generate an application store interface tailored to the particular client. For example, store customization module 321 may initially display applications the administrator has already purchased or has authorized the clients to purchase, as determined by accessing application permission data 317. Store customization module 321 may also further filter the applications based on client inventory information 395 previously provided by the agent module 380 executing on the particular client. For example, store customization module 321 may access client inventory data 319 to identify applications that are not currently installed on the client and include these in the customized application store. As another example, store customization module 321 may access client inventory data 319 to determine the versions of applications installed on the client and to identify applications for which an update is available in the application store. As a further example, store customization module 321 may identify frequently-used applications based on usage data included in client inventory data 319 and include recommendations for related applications in the application store. After generating the customized store interface for the client user, store customization module 321 may transmit the store interface 391 via Internet 340 to the corresponding client computing device 375 for display.

Selection receiving module 323 may subsequently receive an application purchase 393 from administrator computing device 350 or a purchase 397 from a client computing device 375. In response, assuming the application is not free of charge, payment processing module 325 may process the transaction to charge the purchasing user for the amount of the purchase. For example, when an administrative user has selected an application to be installed on multiple clients, payment processing module 325 may determine a purchase price based on the number of clients within the administrative user's computing environment. When the user has successfully completed the purchase, payment processing module 325 may notify management console module 330 of the purchase.

Management console module 330 may include functionality for managing the installation of applications on multiple client devices, including client computing device 375. Although illustrated as a component of server 300, management console module 330 may be located in a separate server in communication with server 300. Regardless of its location, management console module 330 may be in communication with application store module 320 via a portal or other data interface. In this manner, management console module 330 may receive notifications of application purchases from application store module 320 and, in response, trigger the application installation procedure described below.

For example, management console module 330 may receive an instruction to install a purchased application on each of the client devices 375 included in a given administrative user's computing environment. In response, management console module 330 may identify a management policy corresponding to the purchased application. Next, management console module 330 may establish communication with the client management agent module 380 in client computing device 375. Management console module 330 may then transmit the application data 399 to each client 375 for installation of the application on the client 375 by client management agent module 380.

In some implementations, management console module 330 may initiate the installation of the client management agent module 380 on each client devices. For example, the client agent may be one of the applications listed in the customized application store interface displayed to the administrative user. Upon receipt of an administrative user's instruction to install the agent on each client device, application store module 320 may provide an instruction to management console module 330 to start the installation process. In response, client management console module 330 may transmit a message to a respective user of each client device including instructions for installing the agent. For example, the message may be an email, text message, or other communication that includes a link to an executable package used to install the agent on the client. After agent module 380 is installed on each client, management console module 330 may then manage the installation of additional applications by providing application data 399 to each agent 380, as described above.

To give a specific example of the operation of management console module 330, suppose an administrative user has purchased a new operating system displayed in application store interface 391 for installation on each client 375 in his or her computing environment. In response, management console module 330 may communicate with each agent module 380 to back up each client's personal data to data storage module 310. Management console module 330 may then provide the operating system data to each agent 380, such that each agent 380 may image the corresponding client 375 with the new operating system. Finally, management console module 330 may redeploy the saved personal data to each client 375 via agent 380. In this manner, the administrative user may install the new operating system on each client device by simply purchasing the operating system from the application store.

Administrator computing device 350 may be a computing device used by an administrative user to manage a computing environment including a number of client devices 375. As detailed below, administrator computing device 350 may include a series of modules 355-370 for allowing the administrative user to access an application store to purchase applications or authorize applications for purchase by client devices.

Application store accessing module 355 may access the application store interface 391 from server 300 via Internet 340. For example, in response to a request from the administrative user, module 355 may send a request for a customized application store interface to server 300. Upon receipt of the interface 391, module 355 may then display the interface 391 using a web browser or other application.

Agent installing module 360 may allow the administrative user to install a client management agent 380 on each client device 375. More specifically, in some implementations, the application store interface 391 may list the client agent as an application that can be installed on each client device. Thus, the administrative user may select the agent for installation and, in response, agent installing module 360 may transmit an agent install instruction to application store module 320. As detailed above, management console module 330 may then transmit instructions for installing the agent 380 to a user associated with each client.

Application purchasing module 365 may allow a user to purchase particular applications included in the application store interface 391. For example, upon user selection of the interface element for purchasing a particular application, purchasing module 365 may transmit an indication of the purchase 393 to server computing device 300. As detailed above, application store module 320 may then trigger installation of the purchased application on each client device via communication between management console module 330 and each agent module 380.

Similarly, purchase authorization module 370 may allow an administrative user to authorize the purchase of a particular application by each client. For example, the administrator may select an application to be authorized for installation from application store interface 391 and, in response, module 370 may transmit an authorization 393 to server computing device 300. Server computing device 300 may then record the authorization in application permission data 317, such that the application store interface 391 transmitted to clients 375 includes the authorized application. In this manner, the client users may individually install the authorized application on their devices, rather than the administrator installing the application on all clients.

As with administrator computing device 350, client computing device 375 may be, for example, a notebook computer, a desktop computer, an all-in-one system, a thin client, a workstation, a tablet computing device, a mobile phone, or any other computing device suitable for execution of the functionality described below. Individual client users may each have access to a client device 375, such that the client users may access the application store interface and install applications.

Client management agent module 380 may allow client device 375 to interface with management console module 330 of server computing device 300. Thus, agent module 380 may periodically gather inventory information and transmit the information 395 to server 300. The inventory information 395 may describe any characteristics of the hardware and/or software of client 375. Thus, as an example, the inventory information 395 may identify applications installed on client 375, the version of each application, and data describing the usage of the application (e.g., time spent using the application). As detailed above, server 300 may use the inventory information 395 to generate a customized application store interface 391 for each client.

In some implementations, agent module 380 may also manage the installation of a particular application on client 375. For example, as detailed above, management console module 330 may initiate the application installation process by establishing communication with agent module 380. In response, console module 330 may begin transmitting the application data 399 to agent module 380, which, in turn, may use the data to install the application on client 375.

Application store accessing module 385 may be configured similarly to module 355 of administrator computing device 350. Thus, store accessing module 380 may initially send a request for a customized application store interface to server 300. Upon receipt of the interface 391 from server 300, module 380 may then display the interface 391 using a web browser or other application.

Figure 4:
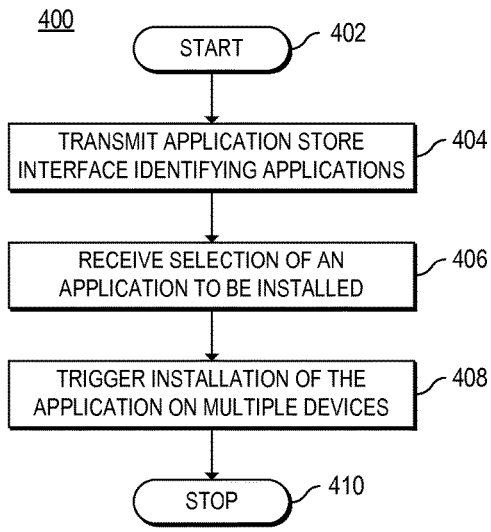
FIG. 4 is a flowchart of an example method for execution by a server computing device to provide an application store interface that enables remote management of client devices.

FIG. 4 is a flowchart of an example method 400 for execution by a server computing device 100 to provide an application store interface that enables remote management of client devices. Although execution of method 400 is described below with reference to server computing device 100 of FIG. 1, other suitable devices for execution of method 400 will be apparent to those of skill in the art (e.g., server computing device 300). Method 400 may be implemented in the form of executable instructions stored on a machine-readable storage medium, such as storage medium 120, and/or in the form of electronic circuitry.

Method 400 may start in block 402 and proceed to block 404, where server computing device 100 may transmit an application store interface for display on a user's device, such as the device of an administrative user. The application store interface may identify a plurality of applications available for installation on client devices within the administrative user's computing environment. Thus, the application store may include a listing of applications, a purchase price (if applicable), and one or more user interface elements for receiving an install instruction from the user.

After transmission of the application store interface, server computing device 100 may then receive, in block 406, a selection of an application to be installed on a plurality of client devices included in the user's computing environment. In response, in block 408, server computing device 100 may trigger installation of the application on the plurality of client devices. In some implementations, a management console in communication with the application store interface may manage the installation process. Thus, upon provision of an install instruction to the management console from the application store interface via a portal or other interface, the management console may establish communication with an agent executing on each client and manage the installation process based on communication with the agent. After installation of the selected application on each client device, method 400 may then stop in block 410.

Figure 5:
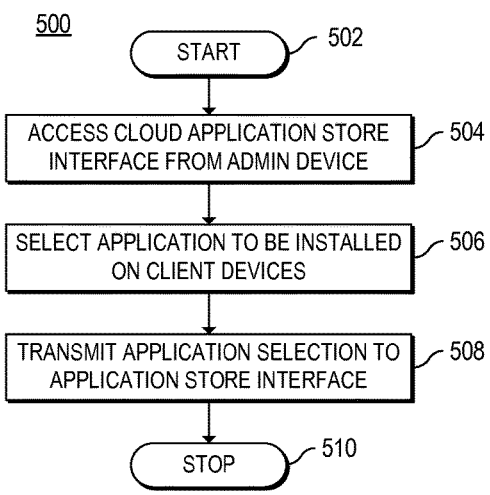
FIG. 5 is a flowchart of an example method for execution by an administrator computing device to remotely manage client devices.

FIG. 5 is a flowchart of an example method 500 for execution by an administrator computing device 200 to remotely manage client devices. Although execution of method 500 is described below with reference to administrator computing device 200 of FIG. 2, other suitable devices for execution of method 500 will be apparent to those of skill in the art (e.g., administrator computing device 350). Method 500 may be implemented in the form of executable instructions stored on a machine-readable storage medium, such as storage medium 220, and/or in the form of electronic circuitry.

Method 500 may start in block 502 and proceed to block 504, where administrator computing device 200 may access an application store from a server. In some implementations, the server may be a cloud-based server accessible to device 200 over the Internet. In response to accessing the application store, the server may provide device 200 with a user interface including a listing of the available applications, a purchase price for each application (if applicable), and user interface element(s) for selecting each application for installation.

The user of administrator computing device 200 may then browse the available applications and, in block 506, device 200 may receive a selection of a particular application to be installed. For example, the user may interact with the application store user interface to select a particular application desired for installation on multiple clients. In response, in block 508, administrator computing device 200 may transmit the application selection to the application store interface executing on server 100. As detailed above, the server 100 may then manage the installation process by communicating with an agent residing on each client device. For example, in some implementations, the application store interface may notify a management console in communication with server 100 of the application selection and the management console may then communicate with each agent to install the selected application. After transmission of the application selection to the server 100, method 500 may then proceed to block 510, where method 500 may stop.

Figure 6:
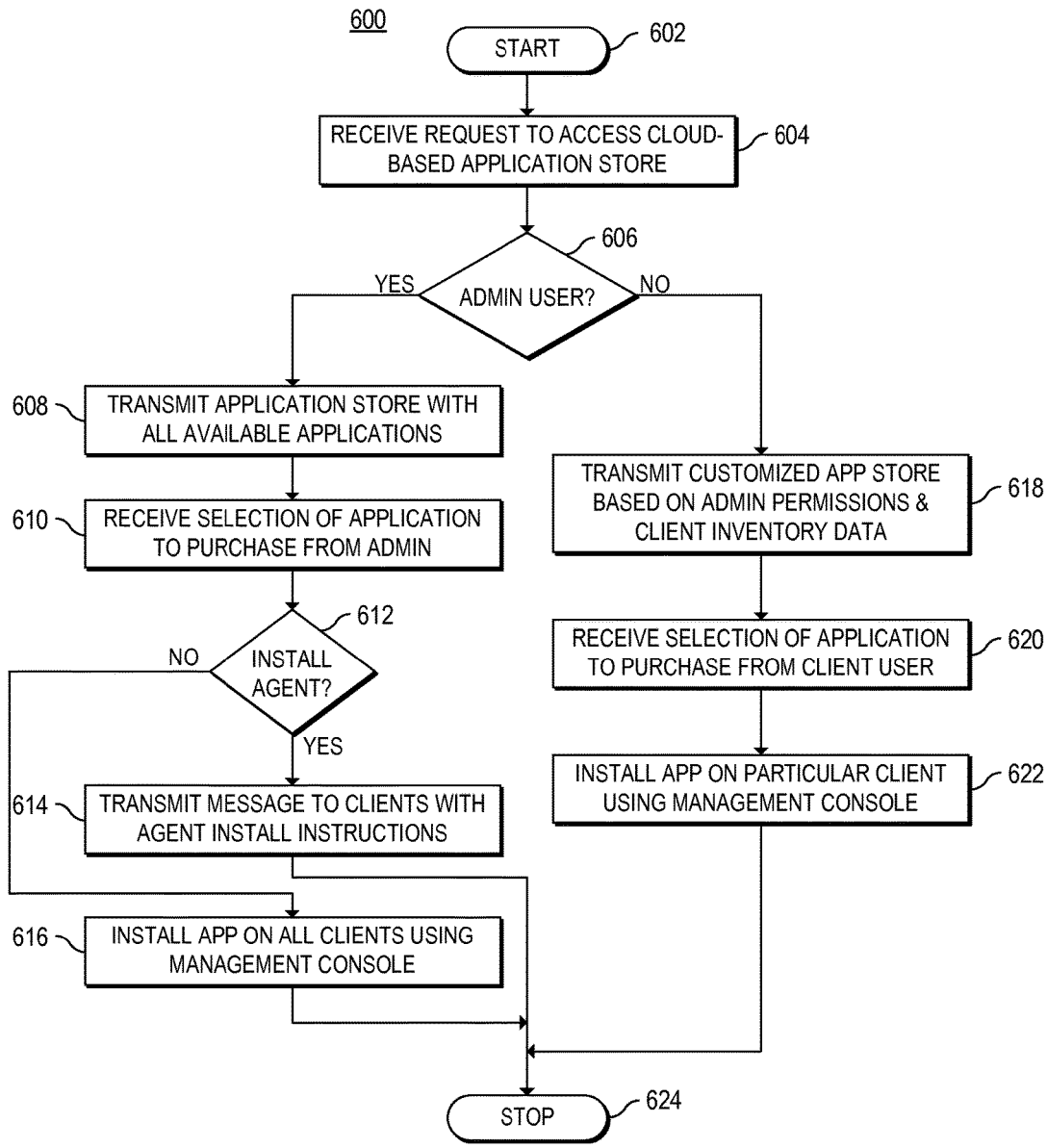
FIG. 6 is a flowchart of an example method for execution by a server computing device for remotely managing the installation of applications based on user selections provided to an application store interface.

FIG. 6 is a flowchart of an example method 600 for execution by a server computing device 300 for remotely managing the installation of applications based on user selections provided to an application store interface. Although execution of method 600 is described below with reference to server computing device 300 of FIG. 3, other suitable devices for execution of method 600 will be apparent to those of skill in the art. Method 600 may be implemented in the form of executable instructions stored on a machine-readable storage medium and/or in the form of electronic circuitry.

Method 600 may start in block 602 and proceed to block 604, where server 300 may receive a request to access the cloud-based application server from a computing device 350, 375. Server 300 may then determine in block 606 whether the user requesting access to the application store is an administrative user or a general client user.

If the user requesting access to the store is an administrative user, method 600 may proceed to block 608, where application store module 320 of server 300 may generate an application store interface customized for the administrative user. In some implementations, application store module 320 may simply transmit an application store interface including all available applications. In other implementations, application store module 320 may filter the available applications based on client inventory data 319 by, for example, displaying applications that are not installed on client devices 375 or for which updates are available.

Next, in block 610, server 300 may receive the administrative user's selection of an application to be installed on the plurality of client devices belonging to the computing environment managed by the administrative user. In block 612, application store module 320 may determine whether the identified application is the client management agent to be installed on each client.

If the identified application is the client management agent, method 600 may proceed to block 614, where server 300 may transmit a message to a user associated with each client device. The message may be an email, text message, or other communication that includes instructions for installing the client agent on the respective client device. For example, the message may include a link to an installation package that the client can execute to install the client management agent. After installation of the client management agent, the agent may collect inventory information and manage the installation of other applications, as described above in connection with module 380 of FIG. 3. Method 600 may then proceed to block 624, where method 600 may stop.

Otherwise, if application store module 620 determines in block 612 that the identified application is an application other than the client management agent, method 600 may proceed to block 616. In block 616, application store module 320 may transmit an instruction to management console module 330 to manage installation of the application. For example, management console module 330 may call a management policy corresponding to the purchased application, thereby initiating communication of application data between the module 330 and the agent module 380 installed on each client device 375. Each agent module 380 may then manage the installation process based on continued communication with management console module 330. After installation of the application is completed for each client 375, method 600 may proceed to block 624, where method 600 may stop.

Alternatively, when it is determined in block 606 that the requesting user is a general client (i.e., not an administrative user), method 600 may proceed to block 618. In block 618, application store module 320 may transmit an application store interface customized for the particular client 375. The application store interface may initially be filtered to only display applications that the administrative user has authorized for purchase by the client 375. In addition, the application store interface may be further filtered based on client inventory information previously provided from the particular client 375 to server 300. For example, the application store may only include applications that are not installed on client 375 or for which updates are available.

Next, in block 620, server 300 may receive a selection of an application to be installed on the particular client 375 from the client user. In response, in block 622, application store module 320 may provide an instruction to management console module 330 to install the selected application on the client 375. As in block 616, management console module 330 may then establish communication with the agent module 380 of client 375 to manage the application installation process. After the application is installed on client 375, method 600 may proceed to block 624, where method 600 may stop.

The foregoing disclosure describes a number of example embodiments for installing software on client devices within a computing environment based on interaction with an application store. Example embodiments greatly simplify the remote administration of client devices by allowing even users with limited technical knowledge to effectively manage the applications that are installed in a computing environment. Additional embodiments and advantages of such embodiments will be apparent to those of skill in the art upon reading and understanding the foregoing description.

I claim:

1. A server for remote management of client computing devices, the server comprising:
    a management console;
    a processor; and
    a non-transitory storage medium storing instructions that are executable on the processor to:
        generate a customized application store user interface based on filtering a plurality of applications to select a subset of the plurality of applications, the filtering comprising determining, based on client inventory data, applications already installed on the client computing devices, the customized application store user interface identifying the selected subset of the plurality of applications,
        transmit the customized application store user interface to a user computing device of a user,
        receive, from the user computing device, a selection made by the user within the customized application store user interface of a particular application to be installed on the client computing devices associated with the user, and trigger installation of the particular application by an agent executing on each of the client computing devices, wherein the triggering of the installation comprises providing an instruction to trigger installation of the particular application to the management console, and the management console to communicate with each agent to manage installation of the particular application on each of the client computing devices.

2. The server of claim 1, wherein the client computing devices associated with the user belong to a computing environment managed by the user.

3. The server of claim 1, wherein:
one of the plurality of applications is the agent to be executed on each of the client computing devices, and
the instructions are executable on the processor to further:
receive, from the user computing device, an instruction to install the agent on each of the client computing devices, and
transmit a message to each of the client computing devices, the message providing instructions to respective users of the client computing devices for installing the agent.

4. The server of claim 1, wherein the instructions are executable on the processor to further:
receive, from a first client computing device of the client computing devices, a request for an application store user interface;
in response to the request from the first client computing device, generate a further customized application store user interface tailored to the first client computing device, the generating of the further customized application store user interface based on filtering the plurality of applications based on client inventory data that relates to applications installed on the first client computing device, to select respective applications available to install on the first client computing device;
transmit, to the first client computing device, the further customized application store user interface that identifies the respective applications to the first client computing device.

5. The server of claim 4, wherein the instructions are executable on the processor to:
filter the plurality of applications for identification by the further customized application store user interface based on applications purchased or authorized for purchase by an administrative user of the user computing device.

6. The server of claim 1, wherein the instructions are executable on the processor to receive the client inventory data from the client computing devices.

7. The server of claim 1, wherein the client inventory data specifies usage of the applications already installed on the client computing devices.

8. The server of claim 1, wherein the filtering comprises identifying an application that is currently not installed on the client computing devices, and including the identified application as an application identified by the customized application store user interface.

9. The server of claim 1, wherein the filtering comprises identifying a version of a given application that is currently installed on the client computing devices, and including a new version of the given application as an application identified by the customized application store user interface.

10. The server of claim 1, wherein the instructions are executable on the processor to perform the generating of the customized application store user interface and the transmitting of the customized application store user interface in response to determining that the user is an administrative user associated with the client computing devices.

11. A non-transitory machine-readable storage medium encoded with instructions executable by an administrator computing device in a computing environment including a plurality of clients, the instructions upon execution causing the administrator computing device to:
receive a customized application store user interface from a cloud-based server, the customized application store user interface generated by the server based on filtering a plurality of applications to select a subset of the plurality of applications, the filtering comprising determining, based on client inventory data, applications already installed on the plurality of clients, the customized application store user interface identifying the subset of the plurality of applications available to purchase for installation on the plurality of clients;
display the customized application store user interface on a display of the administrator computing device;
receive a purchase instruction made in the customized application store user interface, the purchase instruction identifying a particular application of the subset of the plurality of applications to be purchased; and
transmit, to the server, an indication of purchase in response to the purchase instruction, the indication of purchase to cause provision, to a management console in the server, of an installation instruction to trigger installation of the particular application, the installation instruction to cause the management console to communicate with an agent of each of the plurality of clients to manage installation of the particular application on each of the plurality of clients.

12. The non-transitory machine-readable storage medium of claim 11, wherein the instructions upon execution cause the administrator computing device to further:
receive an agent install instruction made in the customized application store user interface; and
transmit, to the server, an indication of purchase of an agent in response to the agent purchase instruction, the indication of purchase of the agent to trigger transmission of a message to each of the plurality of clients, the message including instructions for installing the agent at the plurality of clients,
wherein the agent is to manage installation of each application purchased by an administrative user using the customized application store user interface.

13. The non-transitory machine-readable storage medium of claim 11, wherein the instructions upon execution cause the administrator computing device to further:
provide a purchase authorization instruction to the customized application store user interface, the purchase authorization instruction identifying respective applications that the server is to permit a purchase and installation in response to requests from respective users of the plurality of clients.

14. A method comprising:
generating, by a server comprising a computer processor, a customized application store user interface based on filtering a plurality of applications to select a subset of the plurality of applications, the filtering comprising determining, based on client inventory data, applications already installed on client computing devices, the customized application store user interface identifying the selected subset of the plurality of applications;
transmitting, by the server to an administrator computing device, the customized application store user interface identifying the subset of the plurality of applications available to purchase for installation on the client computing devices belonging to a computing environment managed by an administrative user of the administrator computing device;

receiving, by the server from the administrator computing device, an indication of a purchase of a particular application to be installed on the client computing devices, the indication of purchase responsive to a selection made by the administrative user in the customized application store user interface displayed at the administrator computing device;

triggering, by the server, installation of the particular application on each of the plurality of client computing devices, wherein the triggering of the installation comprises providing an instruction to trigger installation of the particular application to the management console; and communicating, by the management console, with an agent on each of the client computing devices to manage installation of the particular application on each of the client computing devices.

15. The method of claim 14, further comprising:

receiving, by the server from a first client computing device of the plurality of client computing devices, a request for an application store user interface;

in response to the request from the first client computing device, generating, by the server, a further customized application store user interface tailored to the first client computing device, the generating of the further customized application store user interface based on filtering the plurality of applications based on client inventory data that relates to applications installed on the first client computing device, to select respective applications available to install on the first client computing device; and transmitting, by the server to the client computing device, the further customized application store user interface that identifies the respective applications available to install on the first client computing device.

16. The method of claim 15, wherein the respective applications identified in the further customized application store user interface are filtered based on applications purchased or authorized for purchase by the administrative user.

17. The method of claim 14, wherein the filtering comprises identifying an application that is currently not installed on the client computing devices, and including the identified application as an application identified by the customized application store user interface.

18. The method of claim 14, wherein the filtering comprises identifying a version of a given application that is currently installed on the client computing devices, and including a new version of the given application as an application identified by the customized application store user interface.

19. The method of claim 14, wherein the generating of the customized application store user interface and the transmitting of the customized application store user interface are performed in response to a request received from the administrative user.

* * * * *